United States Patent
Sauer et al.

(10) Patent No.: US 12,286,597 B2
(45) Date of Patent: Apr. 29, 2025

(54) FORECASTING THE PROGRESS OF COKING AND FOULING FOR IMPROVED PRODUCTION PLANNING IN CHEMICAL PRODUCTION PLANTS

(71) Applicant: BASF SE, Ludwigshafen am Rhein (DE)

(72) Inventors: Simeon Sauer, Heidelberg (DE); Daniel Keck, Ludwigshafen am Rhein (DE); Eric Jenne, Ludwigshafen am Rhein (DE); Alexander Badinski, Ludwigshafen am Rhein (DE); Miriam Angela Anna Hahkala, Ludwigshafen am Rhein (DE); Bart Blankers, Antwerp (BE); Hendrik De Winne, Antwerp (BE); Britta Carolin Buck, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 336 days.

(21) Appl. No.: 17/629,435

(22) PCT Filed: Jul. 27, 2020

(86) PCT No.: PCT/EP2020/071140
§ 371 (c)(1),
(2) Date: Jan. 24, 2022

(87) PCT Pub. No.: WO2021/014025
PCT Pub. Date: Jan. 28, 2021

(65) Prior Publication Data
US 2022/0243133 A1    Aug. 4, 2022

(30) Foreign Application Priority Data

Jul. 25, 2019 (EP) ........................ 19188437
Sep. 17, 2019 (EP) ........................ 19197875

(51) Int. Cl.
*C10G 9/36* (2006.01)
*C10G 9/16* (2006.01)
(Continued)

(52) U.S. Cl.
CPC ............... *C10G 9/36* (2013.01); *C10G 9/16* (2013.01); *C10G 9/206* (2013.01); *F27D 19/00* (2013.01);
(Continued)

(58) Field of Classification Search
CPC . C10G 9/36; C10G 9/16; C10G 9/206; C10G 9/12; F27D 19/00; G05B 23/0283;
(Continued)

(56) References Cited

U.S. PATENT DOCUMENTS

| | | |
|---|---|---|
| 2008/0140352 A1 | 6/2008 | Goebel et al. |
| 2009/0048816 A1 | 2/2009 | Srinivasa et al. |

(Continued)

FOREIGN PATENT DOCUMENTS

| | | |
|---|---|---|
| CN | 101370926 A | 2/2009 |
| CN | 103207949 A | 7/2013 |

(Continued)

OTHER PUBLICATIONS

English translation for CN 105423770 A (Year: 2016).*

(Continued)

*Primary Examiner* — Lee E Rodak
*Assistant Examiner* — Byung Ro Lee
(74) *Attorney, Agent, or Firm* — Faegre Drinker Biddle & Reath LLP (57) ABSTRACT

In order to predict the future evolution of a health-state of an equipment and/or a processing unit of a chemical production plant, e.g., a steam cracker, a computer-implemented method is provided, which builds a data-driven model for the future key performance indicator based on the key (Continued)

performance indicator of today, the processing condition of today, and the processing condition over a prediction horizon.

14 Claims, 6 Drawing Sheets

(51) Int. Cl.
*C10G 9/20* (2006.01)
*F27D 19/00* (2006.01)
*G05B 23/02* (2006.01)
*G06F 30/27* (2020.01)
*G06F 119/22* (2020.01)
*G06Q 10/04* (2023.01)

(52) U.S. Cl.
CPC ......... *G05B 23/0283* (2013.01); *G06F 30/27* (2020.01); *G06Q 10/04* (2013.01); *G06F 2119/22* (2020.01)

(58) Field of Classification Search
CPC ...... G06F 30/27; G06F 2119/22; G06F 30/20; G06F 2119/02; G06F 2119/04; G06Q 10/04; G06Q 10/06393
USPC .......................................................... 702/182
See application file for complete search history.

(56) References Cited

U.S. PATENT DOCUMENTS

| | | | |
|---|---|---|---|
| 2010/0191361 A1 | 7/2010 | McCready et al. | |
| 2011/0016073 A1 | 1/2011 | Katnikov | |
| 2017/0101586 A1 | 4/2017 | Iliyas et al. | |
| 2019/0188584 A1* | 6/2019 | Rao | G06Q 10/00 |

FOREIGN PATENT DOCUMENTS

| | | |
|---|---|---|
| CN | 104711009 A | 6/2015 |
| CN | 105423770 A | 3/2016 |
| JP | 52-040384 B2 | 10/1977 |
| JP | 07-268356 A | 10/1995 |
| JP | 2017-524041 A | 8/2017 |
| RU | 2503948 C2 | 1/2014 |

OTHER PUBLICATIONS

International Search Report and Written Opinion received for PCT Patent Application No. PCT/EP2020/071140, mailed on Nov. 27, 2020, 9 pages.

Kelling et al., "Development of a control concept for catalyst regeneration by coke combustion" Chemical Engineering Science, vol. 83, 2012, pp. 138-148.

Liu C et al., "Cyclic scheduling for best profitability of industrial cracking furnace system", Computers & Chemical Engineering, Pergamon Press, Oxford, GB, vol. 34, No. 4, Apr. 5, 2010 (Apr. 5, 2010), pp. 544-554.

Rostrup-Nielsen et al., "Industrial relevance of coking", Catalysis Today, vol. 37, 1997, pp. 225-232.

Genkin, Equipment of chemical plants: Textbook for technical schools.—3rd ed., rev. and ext, 1978, 272, 7 pages.

International Preliminary Report on Patentability received for PCT Patent Application No. PCT/EP2020/071140, mailed on Feb. 3, 2022, 8 pages.

Izmenenie, Change of efficiency of chemical equipment in the process of operation Candidate of technical sciences A.A. Toporov, doctor of technical sciences, Prof. A.S.Parfenyuk. Donetsk National Technical University. Series Chemical Engineering and Engineering Ecology, vol. 1, No. 19, 2014, pp. 98-105.

Yuelong et al., "Heat exchanger health status state prediction", vol. 1, No. 1, Jan. 28, 2015, pp. 91-96.

* cited by examiner

FORECASTING THE PROGRESS OF COKING AND FOULING FOR IMPROVED PRODUCTION PLANNING IN CHEMICAL PRODUCTION PLANTS

CROSS-REFERENCE TO RELATED APPLICATIONS

This application is a national stage application (under 35 U.S.C. § 371) of PCT/EP2020/071140, filed Jul. 27, 2020, which claims benefit of European Application Nos. 19188437.8, filed Jul. 25, 2019, and 19197875.8, filed Sep. 17, 2019, all of which are incorporated herein by reference in their entirety.

FIELD OF THE INVENTION

The present invention relates to a computer-implemented method and an apparatus for predicting a progress of degradation in an equipment of a chemical production plant.

BACKGROUND OF THE INVENTION

Chemical production plants may suffer from coking or other fouling processes. One example of such chemical production plant is a steam cracker. The steam cracker uses steam to "crack" crude petroleum, products like naphtha or liquefied petroleum gas (LPG), at a temperature of about 850° C. This produces olefins like ethylene, propylene and the C4-products as well as aromatics, such as benzole, toluole, xylole etc. They are the basic products of chemistry based on fossil fuels. During the operation of the steam-cracker, some equipment or processing units may suffer from accumulation of cokes residues. For example, the inner walls of cracking coils in the furnaces of steam-crackers suffer from cokes layer formation during operation. The same issue arises in the transfer line exchangers directly downstream to the furnaces. As this deteriorates the performance of both equipment types, the cokes has to be removed periodically either by burn-off, or by mechanical means. If the cokes has not been removed at the right time, unplanned production losses may be caused by reduced effectiveness or failure of assets. Similar coking, or more generally, fouling processes mitigate the efficiency of process equipment also in other chemical plants.

Another example of such chemical production plant is a dehydrogenation reactor, as described in the following publication: R. Kelling, G. Kolios, C. Tellaeche, U. Wegerle, V. M. Zahn, A. Seidel-Morgenstern: "Development of a control concept for catalyst regeneration by coke combustion", Chemical Engineering Science, Volume 83, 2012, Pages 138-148. Further examples can be found in Jens R. Rostrup-Nielsen: "Industrial relevance of coking", Catalysis Today, Volume 37, Issue 3, 1997, Pages 225-232.

As a further example, also the aniline catalyst used in a fluidized bed reactor suffers from cokes formation during operation. This may lead to a reduction of the aniline production, insufficient heat dissipation, reduction of the bed height and ultimately to the collapse of fluidization. Therefore, the cokes has to be removed periodically by oxidation ending the running campaign.

SUMMARY OF THE INVENTION

There may be a need to provide a system to provide a reasonable prediction on the expected health-state-evolution of an equipment and/or a processing unit of a chemical production plant over a prediction horizon.

The object of the present invention is solved by the subject-matter of the independent claims, wherein further embodiments are incorporated in the dependent claims. It should be noted that the following described aspects of the invention apply also for the computer implemented method and the apparatus.

A first aspect of the present invention provides a computer-implemented method for predicting a progress of degradation in an equipment of a chemical production plant, comprising:

a) obtaining (110) a future value of at least one operating parameter of the equipment,
   wherein the at least one operating parameter has an influence on the degradation of the equipment, and
   wherein the at least one operating parameter is known and/or controllable over a prediction horizon, such that the future value of the at least one operating parameter can be determined over the prediction horizon;

b) using (120) a prediction model to estimate a future value of the at least one key performance indicator within the prediction horizon based on an input data set comprising the future value of the at least one operating parameter,
   wherein the prediction model is parametrized or trained based on a sample set including historical data of at least one process variable and the at least one operating parameter, wherein the at least one process variable is used to determine the at least one key performance indicator; and c) predicting (130) the progress of degradation in the equipment within the prediction horizon based on the future value of the at least one key performance indicator.

In other words, a data-driven forecasting model is used for the prediction of degradation of an equipment of a chemical production plant, such as a steam cracker. In particular, the future evolution of the degradation key performance indicator is to be predicted under the assumption of a given scenario, i.e. one or more given operating parameters, such as plant load, and cracking temperature over a prediction horizon. Based on this information, necessary actions can be implemented to prevent unplanned production losses due to degradation or failure of process equipment. For example, the planning and alignment of downtime between the different furnaces of a steam-cracker can be improved, e.g., by avoiding parallel downtime of two or more furnaces. Data typically used in this context for the prediction model is created close to production process by sensors in the plant.

With the future value of the one or more operating parameters, it may be used to simulate "what-if" scenarios as e.g. change of process conditions, such as reduced feed load, feed composition and reactor temperature over the prediction horizon. It is noted that the proposed prediction models do not extrapolate future operating states from past and/or current operating states, but rather requires a user input for the future operating parameters in order to account for changing operating condition of a plant in the future, such as changing requirements from connected plants and/or optimizing for production performance. The use of values for future operating parameters may account for future changes in plant operation. Key performance indicator is a function of the load on the system. By using the values for future operating parameters, it is possible to include for example the future load onto the system for the prediction.

Allowing the value of the future operation parameters to vary based on planning in the plant may provide an additional degree of freedom, which may increase quality of the prediction model and may make the prediction more robust.

For example, the prediction models may be used as production planning tools for aniline production. The operation in an aniline plant is in general adjusted during a campaign in order to account for changing requirements from connected plants and/or optimizing for catalyst and production performance. Therefore, it may be beneficial to explicitly set these operating parameters and take the changing future operating parameters into account in the model.

In the following, the value of the at least one key performance indicator obtained during the current operation of the equipment may also be referred to as current value of the at least one key performance indicator. The value of the at least one key performance indicator obtained during the past operation of the equipment may also be referred to as past value of the at least one key performance indicator. Similarly, the value of the at least one operating parameter obtained during the current operation of the equipment may be referred to as current value of the at least one operating parameter. The value of the at least one operating parameter obtained during the past operation of the equipment may be referred to as past value of the at least one operating parameter. This also applies to other parameters as described hereafter.

Two exemplary examples will be described in detail hereafter. A brief summary of these two exemplary examples is described below.

In a first example, the inner walls of cracking coils in the furnaces of steam-crackers suffer from cokes layer formation during operation. The same issue arises in the transfer line exchangers (TLEs) directly downstream to the furnaces. As this deteriorates the performance of both equipment types, the cokes has to be removed periodically either by burn-off, or by mechanical means.

To schedule this maintenance procedure, it is of great advantage to know at least 1-2 weeks in advance when a certain critical coil wall temperature (CWT) or critical TLE outlet temperature will be reached. This way, the planning and alignment of downtime between the different furnaces of a steam-cracker can be improved, e.g. by avoiding parallel downtime of two or more furnaces.

The key performance indicator (KPI) for coking in the cracking coils may be the coil wall temperature (CWT); for the TLEs, it may be their outlet temperature.

For both KPIs, a forecasting model may be developed on historical production data. It can predict with quantified confidence margins, the progress of coking in cracking coils and TLEs over the upcoming 4 weeks. Moreover, with the future value of the at least one operating parameter, it can be used to simulate "what-if" scenarios, i.e. change of process conditions, such as a reduced feed load, feed type or cracking temperature.

With the prediction models for the steam cracker, in a quantification of the remaining useful life (RUL) of a furnace/TLE until the next maintenance event, the risk of parallel shutdown of several furnaces may be reduced. Further, with the possibility to simulate alternative production scenarios, such as a reduced feed load, feed type or cracking temperature in the near future, the process manager may be allowed to proactively delay the cleaning procedure, e.g. to synchronize it with other maintenance tasks.

In a second example, also the aniline catalyst used in a fluidized bed reactor suffers from cokes formation during operation. This causes deactivation of the catalyst and therefore a reduction of the aniline conversion, which in turn leads to shorter campaigns, more frequent catalyst regenerations and therefore loss of production. The second effect is the reduction of bed height accompanied in some cases by a decrease of fluidization quality and therefore reduction of the heat transfer. Therefore, the cokes has to be removed periodically by oxidation ending the running campaign.

Also in this case, it may be of great advantage to predict the reactor performance and end of the campaign 1-2 weeks in advance. This is useful for production planning with other connected plants, but also to optimize performance and catalyst lifetime.

The KPIs are here the coking (via pressure drop over the bed), the bed height, the heat transfer coefficient between the bed and the heat exchanger pipes and the aniline conversion.

For all KPIs, a forecasting model may be developed using the historical data for one reactor. The same type of forecasting models may also be developed for more reactors worldwide. Same as in the case of the steam cracker, this model can predict with quantified confidence margins until the specified end of campaign, the progress of coking of the aniline catalyst and the evolution of bed height, heat transfer coefficient and aniline conversion. It can also simulate "what-if" scenarios as e.g. change of process conditions, such as reduced feed load, feed composition and reactor temperature.

The prediction models for the aniline reactor may have at least one of the following benefits:

a) Using the prediction of pressure drop, bed height, heat transfer coefficient and aniline conversion the catalyst life can be extended. This may result in a lower catalyst consumption.

b) The possibility to simulate alternative production scenarios, such as feed load, feed composition and reactor temperature allows for an optimization of the aniline production and better production planning and coordination with connected plants.

With the prediction models for the aniline fluidized bed reactor, the process management can monitor the estimated progress of coking in the near future as well as the evolution of the bed height, heat transfer coefficient and aniline conversion. All KPIs are used to predict campaign length and allow therefore to schedule the regeneration of the catalyst and thus allow for better planning. Further, catalyst life may be extended by minimization of cokes built-up. This can be achieved by an optimization of the process conditions, where different process conditions in the future can be simulated.

Although there is a large variety of affected equipment and chemical production plants, as well as the completely different physical or chemical degradation processes that underlie them, the degradation of these equipments may share some of the following characteristics:

1. The considered equipment of the chemical production plant may have one or more key performance indicators, which are capable of quantifying the progress of degradation.

2. On a time scale longer than the typical production time scales, e.g., batch time for discontinuous processes or a typical time between set point changes for continuous processes, the key performance indicators drift more or less monotonically to ever higher or lower values, indicating the occurrence of an irreversible degradation phenomenon. However, on a shorter time scale, the key performance indicators may exhibit fluctuations that are not driven by the degradation process itself, but rather by varying process conditions or background variables such as the ambient temperature.
3. The key performance indicators return approximately to their baseline after maintenance events, such as cleaning of a fouled heat exchanger, replacement or regeneration of an inactive catalyst, etc.
4. The degradation is driven by creeping, inevitable wear and/or tear of process equipment.

In other words, the evolution of a key performance indicator is to a large extent determined by the process conditions, and not by uncontrolled, external factors, which allows the evolution of the degradation key performance indicator to be forecasted over a certain time horizon, given the planned process conditions in this time frame.

Such a key performance indicator may be selected from parameters comprising: a parameter contained in a set of measured process data, such as an outlet temperature of the transfer line exchanger as described below, and/or a derived parameter representing a function of one or more parameters contained in a set of the measured process data. For example, while catalyst activity is not measured directly in process variables, it manifests itself in reduced yield and/or conversion of the process.

As used herein, the term "current" refers to the most recent measurement, as the measurement for certain equipment may not be carried out in real time.

As used herein, the term "future" refers to a certain time point within a prediction horizon. As will be explained hereafter, the useful prediction horizon for degradation of an equipment usually ranges between hours and months. The applied prediction horizon is determined by two factors. Firstly, the forecast has to be accurate enough to be used as a basis for decision. To achieve accuracy, input data of future production planning has to be available, which is the case for only a limited number of days or weeks into the future. Furthermore, the prediction model itself may lack accuracy due to the underlying prediction model structure or poorly defined parameters, which are a consequence of the noisy and finite nature of the historical data set used for model identification. Secondly, the forecast horizon has to be long enough to address the relevant operational questions, such as taking maintenance actions, making planning decisions.

For example, the progress of degradation is predicted in at least one of the following equipment: a heat exchanger that suffers from a coking or other fouling process due to coke layer formation and/or polymerization; a pipe where mass flow is impeded by a coking or other fouling process due to coke layer formation and/or polymerization; a fixed bed reactor that suffers from a coking or other fouling process due to coke layer formation, polymerization, and/or deposits of solid material originating from an upstream unit operation; a fluidized bed reactor that suffers from a coking or other fouling process due to coke layer formation, polymerization, and/or deposits of solid material originating from an upstream unit operation; and a filter, the efficiency of which deteriorates due to polymerization and/or deposits of solid material originating from an upstream unit operation.

In general, the above and below described method and apparatus may be applied to any equipment piece that suffers from coking or other fouling processes. For example, heat exchangers may suffer from coking or other fouling processes due to coke layer formation or polymerization, or due to microbial or inorganic deposits. For a detailed discussion concerning the coking/fouling phenomena of the heat exchangers, reference is made to the following publications: Cai H, Krzywicki A, Oballa M C. Coke formation in steam crackers for ethylene production. Chemical Engineering and Processing: Process Intensication 2002; 41(3):199-214, and Müller-Steinhagen H. Heat exchanger fouling: Mitigation and cleaning techniques. IChemE; 2000. As a further example, mass flow through pipes may be impeded by coking or other fouling processes due to coke layer formation and polymerization. As a further example, the performance of fixed bed reactors and fluidized bed reactors may suffer from coking or other fouling processes due to coke layer formation, polymerization, and/or deposits of solid material originating from upstream unit operations. As a further example, efficiency of filters may deteriorate due to polymerization and/or deposits of solid material originating from upstream unit operations.

For example, the chemical production plant comprises at least one of: a dehydrogenation reactor, a steam cracker or a fluidized bed reactor.

In general, the above and below described method and apparatus may be applied to any chemical production plant with equipment pieces that chemical production plants may suffer from coking or other fouling processes. One example of such chemical production plant is a steam cracker. Another example of such chemical production plant is a dehydrogenation reactor or fluidized bed reactor.

In an example, step b) further comprises determining a past value of the at least one key performance indicator based on the at least one process variable that was measured during a past operation of the equipment within a predefined period prior to the current operation. Step c) further comprises obtaining a past value of the at least one operating parameter of the equipment during the past operation. In step d), the input data set further comprises the past value of the at least one key performance indicator and the past value of the at least one operating parameter.

The past value may also be referred to as lagged value. Thus, the prediction model is more robust, using lagged variables to incorporate feedback over time. By contrast, a model without lagged variables represents systems that respond exclusively to current events. The predefined time window for lagged values/lag window may be selected by a model developer, e.g., according to the type of the equipment. For example, the predefined period may be 5%, 10%, or 15% of the typical time period between two maintenance actions of the equipment.

According to an embodiment of the present invention, the computer-implemented method further comprises obtaining a value of at least one operating parameter of the equipment obtained during the current and/or past operation of the equipment. The input data set comprises the value of the at least one operating parameter obtained during the current and/or past operation of the equipment.

In other words, the future evolution of the degradation key performance indicator may be predicted based on the current and/or past operating parameters under the assumption of a given scenario, i.e. one or more given operating parameters, such as plant load, and cracking temperature over a prediction horizon. Accordingly, the prediction of the key performance indicator may be more accurate.

According to an embodiment of the present invention, the computer-implemented method further comprises obtaining at least one process variable that is measured during a current and/or past operation of the equipment and determining a value of at least one key performance indicator based on the at least one process variable obtained during the current and/or past operation of the equipment. The input data set further comprises the value of the at least one key performance indicator obtained during the current and/or past operation of the equipment.

In other words, the future evolution of the degradation key performance indicator is to be predicted based on the current and/or past key performance indicator that reflects the current and/or past health state of the equipment. Accordingly, the prediction of the future evolution of the degradation key performance indicator is more accurate.

According to an embodiment of the present invention, the computer-implemented method further comprises repeatedly performing steps a) to c) over a further prediction horizon.

The prediction horizon may be referred to as first prediction horizon, while the further prediction horizon may also be referred to as second prediction horizon.

Using an iterative approach with lagged variables may lead in general to better prediction in the nearer future (in the case of aniline 1-2 weeks). This is due to the fact, that the model uses constantly updated initial values. In the farer future (>4 weeks in case of Aniline), simpler models without lagged variables tend to have better accuracy. The worse performance in the farer future comes from the adding up of the prediction error due to the iterative nature of the model.

According to an embodiment of the present invention, the further prediction horizon is partially overlapped with the prediction horizon. Alternatively, the further prediction horizon is separate from the prediction horizon.

In other words, the second prediction horizon, i.e. further prediction horizon, may start after the first prediction horizon. Alternatively, these two prediction horizons may partially overlap.

According to an embodiment of the present invention, the value of the at least one key performance indicator is determined based on at least one transformed process variable representing a function of the at least one process variable.

For example, the transformation may be a simple summation of feed rates in two or more pipes that both flow in the same transfer line exchanger (TLE). Another approach is to use energy/mass balances or nonlinear transformations on the raw data to increase the information content of data.

For example, if one or more values of the at least one operating parameter in the input data set and/or in the sample set violate a predefined set of operating ranges, the one or more values of the at least one operating parameter are eliminated.

In other words, the prediction model is corrected by filtering or eliminating one or more values of the at least one operating parameters in the input data set and/or in the sample set, when the one or more values of the at least one operating parameter violate a predefined set of operating ranges. In this way, unreasonable observations are filtered out at the stage of training and/or at the stage of using the prediction model for estimating the future value of the at least one key performance indicator. Some examples of unreasonable observations are provided in section A (TLEs) of the present disclosure.

According to an embodiment of the present invention, the prediction model comprises a multiple linear regression model, optionally with regularization.

Regularization may be used to introduce additional information in order to solve an ill-posed problem or to prevent overfilling.

According to an embodiment of the present invention, the historical data comprise historic values of the at least one process variable and the at least one operating parameter of at least 10 cleaning cycles, preferably at least 30 cleaning cycles.

As used herein, the term "cycle" may refer to the time period between two consecutive cleaning procedures, which may be two to three months for a steam-cracker. For aniline, the term "cycle" may also be referred to as campaign.

According to an embodiment of the present invention, the equipment comprises at least one of a steam-cracker furnace, a transfer line exchanger of a steam cracker, and an aniline catalyst.

The steam-cracker furnace and the transfer line exchanger may also be referred to critical components, as their health state has a greater impact on the overall effectiveness of the steam-cracker. In particular, the inner walls of cracking coils in the furnaces of steam-crackers suffer from cokes layer formation during operation. The same issue arises in the transfer line exchanger directly downstream to the furnaces. As this deteriorates the performance of both equipment types, the cokes has to be removed periodically either by burn-off, or by mechanical means. The aniline catalyst used in a fluidized bed reactor suffers from cokes formation during operation. This may lead to a reduction of the aniline production, insufficient heat dissipation, reduction of the bed height and ultimately to the collapse of fluidization. Therefore, the cokes has to be removed periodically by oxidation ending the running campaign.

In an example, the at least one key performance indicator for coking in the steam-cracker furnace includes a tube metal temperature of cracking coils in the steam-cracker furnace. The at least one key performance indicator for coking in the transfer line exchanger includes an outlet temperature of the transfer line exchanger.

In an example, the at least one process variable for determining the at least one key performance indicator for the steam-cracker furnace comprises a tube metal temperature of cracking coils in the steam-cracker furnace. The at least one process variable for determining the at least one key performance indicator for the transfer line exchanger comprises an outlet temperature of the transfer line exchanger.

In an example, the current value of the at least one operating parameter comprises a current Naphtha feed load and/or a current cracking temperature.

In an example, the future value of the at least one operating parameter comprises at least one of: a future Naphtha feed load over the prediction horizon, a future cracking temperature over the prediction horizon, and a feed load accumulated over the prediction horizon and weighted by a weight fraction of each component of an amount of different Naphtha components that will pass the transfer line exchanger during the prediction horizon. The Naphtha components comprise at least one of n-paraffins, i-paraffins, naphthenes, aromates, and olefins.

In an example, the current value and the future value of the at least one operating parameter for the transfer line exchanger further comprise at least one of: a current liquefied petroleum gas feed load, a future liquefied petroleum gas feed load, and a feed load accumulated over the prediction horizon and weighted by a weight fraction of each component of an amount of different liquefied petroleum gas components that will pass the transfer line exchanger during the prediction horizon. The liquefied petroleum gas components comprise at least one of Propane, n-Butane, i-Butane, iso-Butene, 1-Butane, Butene-2-trans, Butene-2-cis, and Pentanes.

A further aspect of the present invention provides an apparatus for predicting a progress of degradation in an equipment of a chemical production plant, comprising:

a) an input unit (210) configured for receiving:

a future value of at least one operating parameter of the equipment,
wherein the at least one operating parameter has an influence on the degradation of the equipment, and
wherein the at least one operating parameter is known and/or controllable over a prediction horizon;
b) a processing unit (220) configured for:
using a prediction model to estimate a future value of the at least one key performance indicator within the prediction horizon based on an input data set comprising the future value of the at least one operating parameter,
wherein the prediction model is parametrized or trained based on a sample set including historical data of the at least one process variable and the at least one operating parameter, wherein the at least one process variable is used to determine the at least one key performance indicator; and
predicting the progress of degradation in the equipment within the prediction horizon based on the future value of the at least one key performance indicator; and
c) an output unit (230) configured for outputting the predicted progress of degradation in the equipment.

According to an embodiment of the present invention, the input unit is configured for obtaining a value of at least one operating parameter of the equipment during the current and/or past operation of the equipment. The input data set comprises the value of the at least one operating parameter obtained during the current and/or past operation of the equipment According to an embodiment of the present invention, the input unit is configured for obtaining at least one process variable that is measured during a current and/or past operation of the equipment. The processing unit is configured for determining a value of at least one key performance indicator based on the at least one process variable obtained during the current and/or past operation of the equipment. The input data set further comprises the value of the at least one key performance indicator obtained during the current and/or past operation of the equipment.

According to an embodiment of the present invention, the processing unit is configured for repeatedly performing the estimation over a further prediction horizon.

According to an embodiment of the present invention, the further prediction horizon is partially overlapped with the prediction horizon. Alternatively, the further prediction horizon is separate from the prediction horizon.

According to an embodiment of the present invention, the processing unit is configured to eliminate one or more values of the at least one operating parameter, if the one or more values of the at least one operating parameter in the input data set and/or in the sample set violate a predefined set of operating ranges.

According to an embodiment of the present invention, the prediction model comprises a multiple linear regression model, optionally with regularization.

A further aspect of the present invention provides a computer program element for instructing an apparatus, which, when being executed by a processing unit, is adapted to perform the method.

A further aspect of the present invention provides a computer readable medium having stored the program element.

BRIEF DESCRIPTION OF THE DRAWINGS

These and other aspects of the invention will be apparent from and elucidated further with reference to the embodiments described by way of examples in the following description and with reference to the accompanying drawings, in which.

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

Method of Predicting a Degradation Progress

Figure 1:
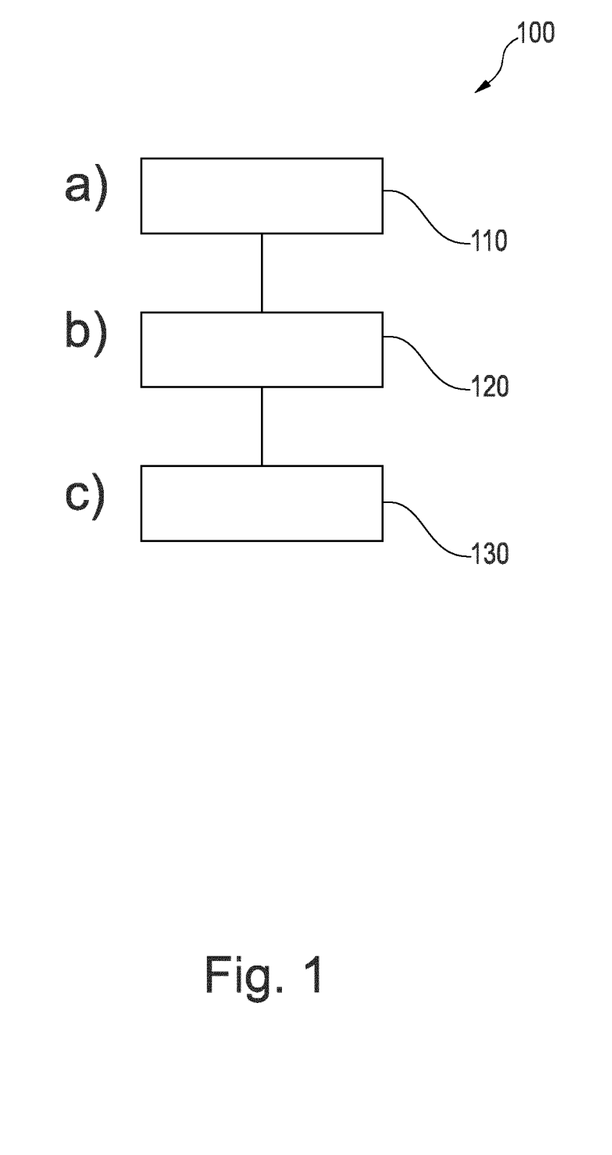
FIG. 1 shows a flow chart illustrating a computer-implemented method for predicting a progress of degradation in an equipment of a chemical production plant.

FIG. 1 shows a flow chart illustrating a computer-implemented method 100 for predicting a progress of degradation in an equipment of a chemical production plant, such as a steam cracker.

In step 110, i.e. step a), a future value of at least one operating parameter of the equipment is obtained. The at least one operating parameter has an influence on the degradation of the equipment. The at least one operating parameter is known and/or controllable over a prediction horizon, such that the future value of the at least one operating parameter can be determined over the prediction horizon Examples for an operating parameter are Naphtha feed load and cracking temperature. The at least one operating parameter has an influence on the progress of degradation of the equipment. In other words, only the operation parameters that are relevant for determining the degradation of the equipment are selected. The at least one operating parameter is known and/or controllable over a prediction horizon, such that a future value of the at least one operating parameter can be planned or anticipated over the prediction horizon.

The useful prediction horizon for degradation of an equipment usually ranges between hours and months. The applied prediction horizon is determined by two factors. Firstly, the forecast has to be accurate enough to be used as a basis for decision. To achieve accuracy, input data of future production planning has to be available, which is available only for limited prediction horizons.

Furthermore, the prediction model itself may lack accuracy due to the underlying prediction model structure or due to poorly defined model parameters, which may be a consequence of the noisy and finite nature of the historical data set used for model identification. Secondly, the forecast horizon has to be long enough to address the relevant operational questions, such as taking maintenance actions, making planning decisions.

Optionally, at least one process variable is measured e.g. by one or more sensors during a current and/or past operation of the equipment. Examples of the process variables may include, but not limited to, temperatures, pressures, flows, levels, and compositions. For the equipment, appropriate sensors may be selected which provide information about the health state of the considered equipment. The sensors may be selected based on experience and process understanding.

The equipment may be one of the critical components, as the health state of the critical components has a stronger influence on maintenance activities of the chemical production plant, such as steam-cracker or a dehydrogenation reactor. The source of this information concerning the selection of critical components can be a bad actor analysis or general experience of operations. Examples of the equipment include, but not limited to, a heat exchanger that suffers from a coking or other fouling process due to coke layer formation and/or polymerization; a pipe where mass flow is impeded by a coking or other fouling process due to coke layer formation and/or polymerization; a fixed bed reactor that suffers from a coking or other fouling process due to coke layer formation, polymerization, and/or deposits of solid material originating from an upstream unit operation; a fluidized bed reactor that suffers from a coking or other fouling process due to coke layer formation, polymerization, and/or deposits of solid material originating from an upstream unit operation; and a filter, the efficiency of which deteriorates due to polymerization and/or deposits of solid material originating from an upstream unit operation.

Optionally, a current value of at least one key performance indicator is determined based on the at least one process variable obtained during the current operation of the equipment. Optionally, a past value of the at least one key performance indicator may be determined based on the at least one process variable that was measured by one or more sensors during a past operation of the equipment within a predefined period prior to the current operation. In other words, besides the current value of the at least one key performance indicator, the past value, i.e., lagged value, of the at least one key performance indicator is determined. The predefined period prior to the current operation may be set by a model developer. For example, the predefined period may be 10% of the time period between two maintenance actions of the equipment.

The key performance indicator may include one or more measured process variables, which represent raw measurements. Optionally, the current value and/or the past value of the at least one key performance indicator is determined based on at least one transformed process variable representing a function of the at least one process variable. In other words, raw measurements are mathematically combined into new variables, such as pressure compensated temperatures, or mass flows calculated from volumetric flow measurements. The new variables, i.e., the transformed process variables, may be created to include the version of the measurement that the process operator is most familiar with, or in order to improve the correlation structure of the data for the prediction model. The key performance indicator may be defined by a user (e.g. process operator) or by a statistical model e.g. an anomaly score measuring the distance to the "healthy" state, namely a state without degradation, of the equipment in a multivariate space of relevant process variables, such as the Hotelling $T^2$ score or the DModX distance derived from principal component analysis (PCA).

Optionally, a current value of at least one operating parameter of the equipment during the current operation is obtained. Optionally, a past value, i.e. lagged value, of the at least one operating parameter of the equipment during the past operation may be obtained.

In step 120, i.e. step b), a prediction model is used to estimate a future value of the at least one key performance indicator within the prediction horizon. The input of the prediction model includes an input data set comprising the future value of the at least one operating parameter.

Optionally, the input data set comprises the value of the at least one operating parameter obtained during the current and/or past operation of the equipment.

Optionally, the input data set further comprises the value of the at least one key performance indicator obtained during the current and/or past operation of the equipment, as it provides the information about the health state of the equipment during the current and/or past operation. The inclusion of the current and/or past value of the at least one key performance indicator as input may improve the prediction accuracy.

The prediction model is parametrized or trained based on a sample set including historical data of the at least one process variable and the at least one operating parameter. As the size of the sample set influences the performance of the prediction model, the historical data preferably comprises historic values of the at least one process variable and the at least one operating parameter of at least 10 cleaning cycles, preferably at least 30 cleaning cycles. For example, the prediction model may use 80% of the historic cleaning cycles to calibrate the model and 20% of the historic cleaning cycles to validate the goodness-of-fit or prediction accuracy of the model. It is also important to recalibrate the model on a regular basis to address process changes that are not captured by the model.

Optionally, the prediction model is corrected by filtering or eliminating one or more values of the at least one operating parameters in the input data set and/or in the sample set, when the one or more values of the at least one operating parameters violate a predefined set of operating ranges. In this way, unreasonable observations are filtered out at the stage of training and/or at the stage of using the prediction model for estimating the future value of the at least one key performance indicator.

An example of the prediction model is a multiple linear regression (MLR) model, which models the relationship between two or more explanatory variables, i.e. optionally the current value of the at least one key performance indicator, the current value of the at least one operating parameter, and the future value of the at least one operating parameter, and a response variable, i.e. the future value of the at least one key performance indicator, by fitting a linear equation to observed data.

In step 130, i.e. step c), the progress of degradation in the equipment within the prediction horizon is predicted based on the future value of the at least one key performance indicator.

It will be appreciated that the above operation may be performed in any suitable order, e.g., consecutively, simultaneously, or a combination thereof, subject to, where applicable, a particular order being necessitated, e.g., by input/output relations.

Examples of Prediction Models

To show that the prediction model is also applicable to predicting the health-state of equipment in the days and weeks ahead, three examples of the equipment are provided including a steam-cracker furnace, a transfer line exchanger, also known as TLE, of a steam cracker, and an aniline catalyst used in a fluidized bed reactor.

A. TLEs

Since TLEs are prone to coking, their cooling capacity deteriorates over time, which may result in an increasing gas temperature at the outlet. With a freshly cleaned TLE, this temperature is around 380° C. It increases within 1-3 months to 470-480° C., which is the threshold for cleaning the device (either by burn-off, or by mechanical means.) In terms of the former sections, the outlet temperature is the key performance indicator to monitor the degradation process. To schedule the cleaning task, it is obviously of great advantage to know at least 1-2 weeks in advance when the critical outlet temperature will be reached.

A further benefit of the prediction of TLE coking is the possibility to simulate alternative scenarios, such as a reduced feed load or cracking temperature in the near future, allowing the process manager to proactively delay the cleaning procedure, e.g., to synchronize it with other maintenance tasks. For these reasons, a reliable prediction of the outlet temperature is an enormous benefit.

A1. TLE A

The prediction target for TLE A is the outlet temperature, i.e. the future value of the key performance indicator. For clarity, this means that we estimate the value of the outlet temperature at a fixed time shift in the future—the prediction horizon—by a prediction model.

The input quantities for the model may be chosen by the following way: First, all quantities that are known or believed influence coking are selected, e.g. by a domain expert. Then, from some of these quantities features are combined, the adequate mathematical form of the prediction model is chosen, and the model historical data is calibrated. It is also preferred to avoid models that memorize irrelevant features in the historic data, and therefore fail to produce accurate predictions new data ("overfilling problem").

As a result, the following features were chosen as input to the model:

a. Quantities measured at current time $t_{now}$ (day at which the prediction is made):
current Naphtha feed load [t/h], averaged over all cracking coils that are connected to TLE A;
current cracking temperature (at 90% of coil length) in [° C.]; and
current TLE outlet temperature;

b. Quantities that can be reliably anticipated over the prediction horizon, because they are (at least in principle) known in the future or even controlled by operations:
Naphtha feed load at $t_{future}$, the day for which the prediction is made, in [t/h];
cracking temperature at $t_{future}$ in
amount of different Naphtha components that will pass the TLE during the prediction horizon in [t]. For clarity, this is defined as the feed load accumulated over the prediction horizon and weighted by the weight fraction of the component in the feed, and denoted by $m_i$ for the i-th component:

$$m_i[\text{tons}] = \int_{t_{now}}^{t_{future}} \text{weight fraction}_i(t)[\%] \cdot \text{feed load}(t)[\text{tons}/h]dt$$

Instead of considering all 29 measured components, we include weight fractions that are aggregated to the following classes of components:
n-paraffins;
i-paraffins;
naphthenes;
aromates; and
olefins.

As an additional step of feature engineering, all of the above input quantities to the model may be expanded to higher polynomial order, e.g., to a second-order factorial model in all inputs. The next step is to determine the relation between these input quantities and the target key performance indicator—the outlet temperature in the future—from historical data, using multiple linear regression. To this end, the historic values of all quantities of the last 48 cleaning cycles (~10 years) was collected, using a sampling rate of 1 h. Several criteria were applied to filter out "bad" observations of the system, i.e., data points that should not be used for regression:
observations for which the TLE was de-coked at time $t_{now}$ or $t_{future}$
observations with "unusually" low or very high feed load at time $t_{now}$ or $t_{future}$
observations with "unusual" cracking temperature values at time $t_{now}$ or $t_{future}$
observations for which one of the input variable or the output is not measured.

Next, the data set was divided into validation set (8 cleaning cycles) and training set (40 cycles). Using the training set only, multiple linear regression was performed.

A robustification method for the least-squares fitting procedure of MLR was used to mitigate the detrimental influence of outliers on the model accuracy.

Figure 2A:
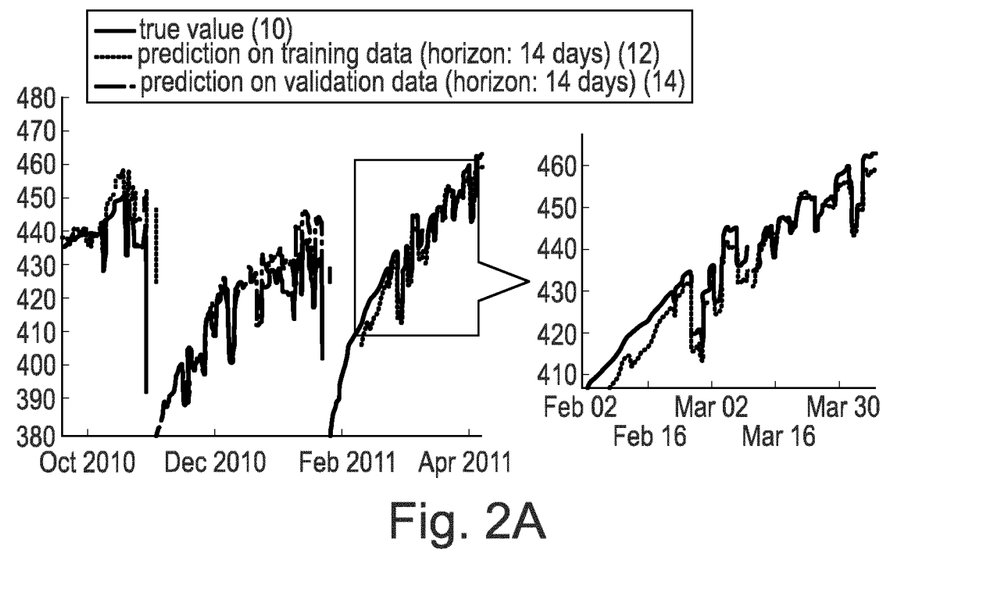
FIG. 2A shows a measured outlet temperature and the corresponding 14-day-prediction for TLE A.

The prediction error (for 1-σ-confidence) of the model was quantified by the root mean squared deviation (RMSE) between model estimate of the prediction and its value at the prediction horizon. The RMSE for validation set and training set are of similar magnitude, showing that the model does not suffer from overfilling. The measured outlet temperature and the corresponding 14-day-prediction are shown in FIG. 2A for an exemplary segment of the history. In particular, the true value 10 of the outlet temperature is compared with the corresponding 14-day-prediction on training data 12 between October 2010 and November 2010 and between February 2011 and April 2011. The true value 10 of the outlet temperature is compared with the corresponding 14-day-prediction on validation data 14 between November 2010 and February 2011. For clarity, the curve 12 and the curve 14 are the prediction for a given day that would have been calculated 14 days ahead of time, if feed load, and feed composition during the prediction horizon had been forecasted accurately.

Figure 2B:
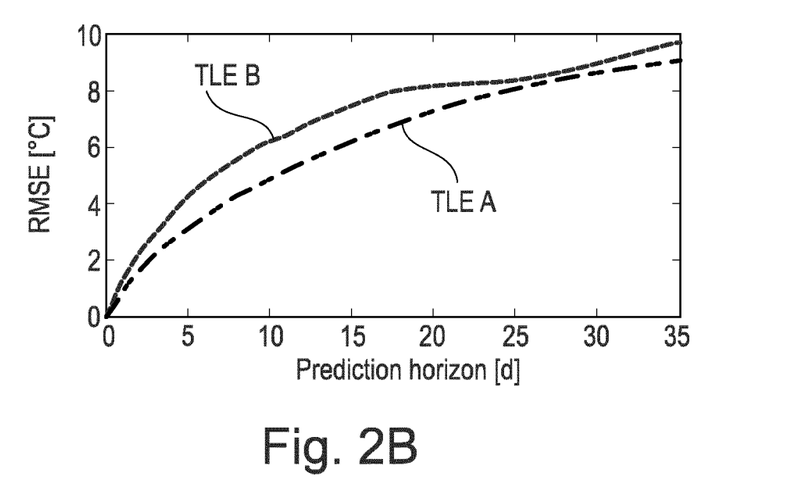
FIG. 2B shows a prediction error of the model for different prediction horizons for TLE A and TLE B.

The agreement between prediction and actual value is very good. Instantaneous changes (caused by sudden changes in the feed load) are captured as well as the general increasing trend caused by coking. The prediction error of the model for different prediction horizons is shown in FIG. 2B. As expected, uncertainty increases the longer one predicts into the future. Yet, the model produces acceptable predictions (error below 10° C.) for horizons up to one month.

A2. TLE B

Very similar to the TLE A, a prediction model for the outlet temperature of TLE B was established. In contrast to the furnace A where TLE A is located, however, the furnace B where TLE B is located does not exclusively process Naphtha, but may also be fed with LPG or a mixture of both ("co-cracking"). This leads to a bigger variation in the cycle length (i.e., the time interval between two cleaning procedures). As a consequence, the plant personnel has a much weaker "gut feeling" for the coking for furnace B compared to furnace A, which increases the benefit of a reliable prediction model.

Also, the possibility to simulate the influence of switching feed stock (e.g., Naphtha to Liquid Petroleum Gas) on the progress degradation, is an additional benefit of the prediction model for TLE B.

As input to the prediction model for TLE B, we started with the same quantities as for TLE A, and added the following:
- current LPG feed load in [t/h];
- LPG feed load at $t_{future}$ in [t/h]; and
- amount of different LPG components, which include:
  - Propane;
  - n-Butane;
  - i-Butane;
  - iso-Butene;
  - 1-Butene;
  - Butene-2-trans;
  - Butene-2-cis; and
  - Pentanes (total);

Criteria for filtering out unreasonable observations were similar to TLE A, apart from a bigger range of valid cracking temperature values. All other steps of the model building process were as described for TLE A.

Figure 3:
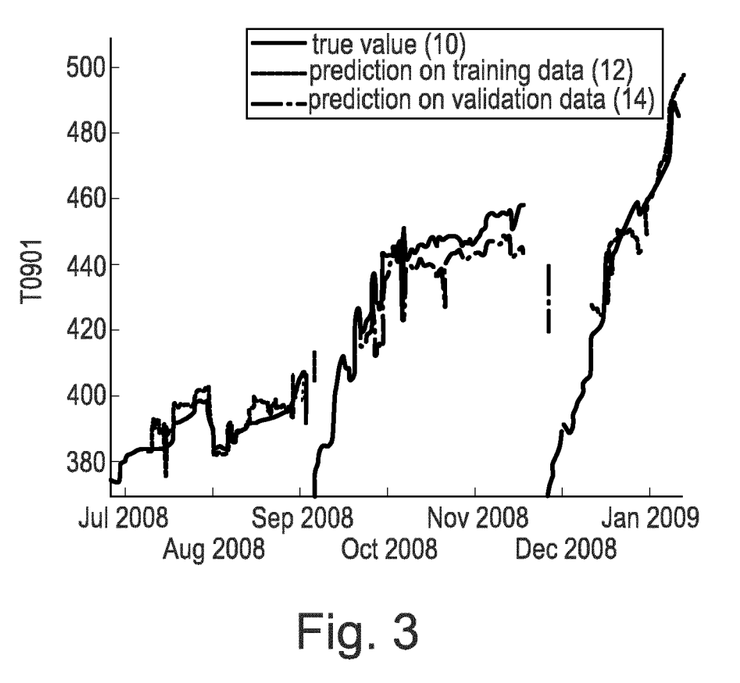
FIG. 3 shows the results of a 14-day-prediction for TLE B.

The results of a 14-day-prediction are shown in FIG. 3. In particular, the true value 10 of the outlet temperature is compared with the corresponding 14-day-prediction on training data 12 between July 2008 and September 2008 and between December 2008 and February 2009. The true value 10 of the outlet temperature is compared with the corresponding 14-day-prediction on validation data 14 between September 2008 and December 2008. The prediction model describes the historic data on both training and validation data up to an acceptable error of ~8° C. The prediction error for TLE B is slightly larger than for TLE A for all horizons, reflecting the expectation of the plant personnel, as co-cracking operation makes coking harder to predict.

Thus, the developed prediction models for the outlet temperature—which is the central key performance indicator for degradation—describe the available 10 years of historic data very well. For predictions of up to two weeks, it allows prediction with an accuracy of +/−7° C. (at 1-σ-confidence level), which is small compared to the temperature window in which the outlet temperature varies normally. Moreover, the model can simulate what influence feed load, cracking temperature and feed composition in the upcoming days have on the progression of the outlet temperature, enabling thus the operations to time the next cleaning procedure to a convenient date.

B. Steam-Cracker Furnace

For the steam-cracker furnace, similar approaches as for TLEs are used. The key performance indicator for coking in the steam-cracker furnace includes a tube metal temperature of cracking coils in the steam-cracker furnace. For determining the key performance indicator, a tube metal temperature of cracking coils in the steam-cracker furnace is the process variable to be measured. For predicting the future value of the key performance indicator, i.e. the tube metal temperature of cracking coils, a prediction model is developed based on historical production data of e.g. last 10 years, using an approach described in the above section A. The prediction model can predict, with quantified confidence margins, the progress of coking in cracking coils over the upcoming four or more weeks. Moreover, it is used to simulate "what-if" scenarios, i.e. change of process conditions, i.e. change of operating parameters, such as a reduced feed load, feed type of cracking temperature.

Operating parameters, validity ranges, derived features, regressions method etc. are identical to those described above for the TLEs.

C. Aniline Catalyst

In case of the Aniline catalyst, the cokes build-up also leads to a performance degradation of the catalyst and with it to decreased production of Aniline. The accumulation of cokes and resulting increase in mass of the catalyst particle lead to an increasing pressure drop over the bed of the fluidized bed reactor. The change in mass of the catalyst particles as well as the change in size further induce a change in bed height and heat transfer coefficient between the catalyst particles and the heat exchanger inside the reactor, also abbreviated with k-value. Additionally, coking reduces also the aniline conversion due to deactivation of the catalyst. In terms of the former sections, the pressure drop over the bed is the key performance indicator to monitor the degradation process. However, the heat transfer coefficient, bed height and aniline conversion are the key performance indicators to determine the end of campaign and with it the start of the regeneration of the catalyst. The end of campaign is usually defined by a drop in bed height below the level of the heat exchanger, a decrease of the heat transfer coefficient and/or aniline conversion below a certain level. Each of these cases ultimately leads to an end of campaign/cycle. The end of campaign is usually reached between 2-5 weeks. To schedule the regeneration of the catalyst it is obviously of great advantage to know the evolution of the key performance parameters within at least the next 1-2 weeks and with them the approximate end of campaign/cycle.

As in the examples described earlier, a further benefit of the prediction is the possibility to simulate alternative scenarios like an increased feed load, feed composition or reactor temperature allowing the process manager to align the regeneration of the catalyst and thus shut-down of the plant with other connected plants.

To reach better prediction results, certain pre-processing steps are applied to the target and input parameters of the model. The target parameters of the model are the key performance indicators, explicitly the pressure drop over the bed, bed height and heat transfer coefficient and separately the aniline conversion. To all target parameters, smoothing algorithms are applied ranging from a simple moving average to a double exponential smoothing algorithm. The input parameters for the model are chosen similar as in the example of the TLEs. First all quantities that are known or believed to influence coking, the heat transfer coefficient, bed height and conversion are selected e.g. by an expert. Furthermore, irrelevant inputs are neglected as this only decreases the model accuracy. In addition, the far outliers of the target as well as input parameters are removed for better model accuracy. The adequate mathematical form of the prediction model is then chosen. This includes the determination of the number of past values and future values taken into account for one iteration of the model. In addition, the regularization algorithm and parameters are chosen in order to avoid an overly accurate prediction of the training data and insufficient generalization of the model, also known as overfilling.

The following features were chosen as possible inputs to the model:
a. Operating parameters measured in the past and present and to be defined in the future by operation:
 MNB flow rate to reactor
 Reactor temperature Flow rate of the cycle gas
Hydrogen concentration of off-gas
b. Process variable calculated in the past and present and obtainable from the future operating parameters:
Age of the catalyst in terms of tons of produced MNB per ton catalyst since first usage of the catalyst
Campaign length in terms of tons of produced MNB per ton catalyst during the running campaign
Average coking rate in the current or previous campaign
c. Initial target variables
Initial bed height
Initial heat transfer coefficient
Initial pressure drop Depending on the operation of the reactor and thus dependency of the prediction of the target variables on the respective input, a different selection of input parameters might be chosen for each reactor. In addition, also the past and present values of the target variables (pressure drop over bed, heat transfer coefficient and bed height) serve as inputs for the model.

For the training, hyper parameter tuning and validation of the model, the method of a nested cross validation was used. Depending on the age of the reactor, a different number of campaigns is available for the training of the model pending from a few years to more than 10 years. Here, five folds were used for the inner and outer fold of the nested cross validation. The prediction error (for 1-σ-confidence) of the model was quantified by the root mean squared deviation (RMSE) between model estimate of the prediction and its value at the prediction horizon. Here the average of the RMSE over the test sets over the outer resampling were used as they give an estimate of the generalization error of the model. Also here, the error increases with increasing prediction horizon. The small difference between training and test set indicate that the model does not suffer from overfilling.

In the long term we assume that the error evolution with time is similar to the one of a random walk, while for short term, the error is dominated by an intrinsic difference between the model and the true data. We therefore propose as model:

$$RMSE(t) = a + b \cdot \sqrt{t}$$

Where the constant offset 'a' represents the short term error and the sqrt(t) dependence the long term evolution of a random walk.

Principle of the Proposed Method

Figure 4A:
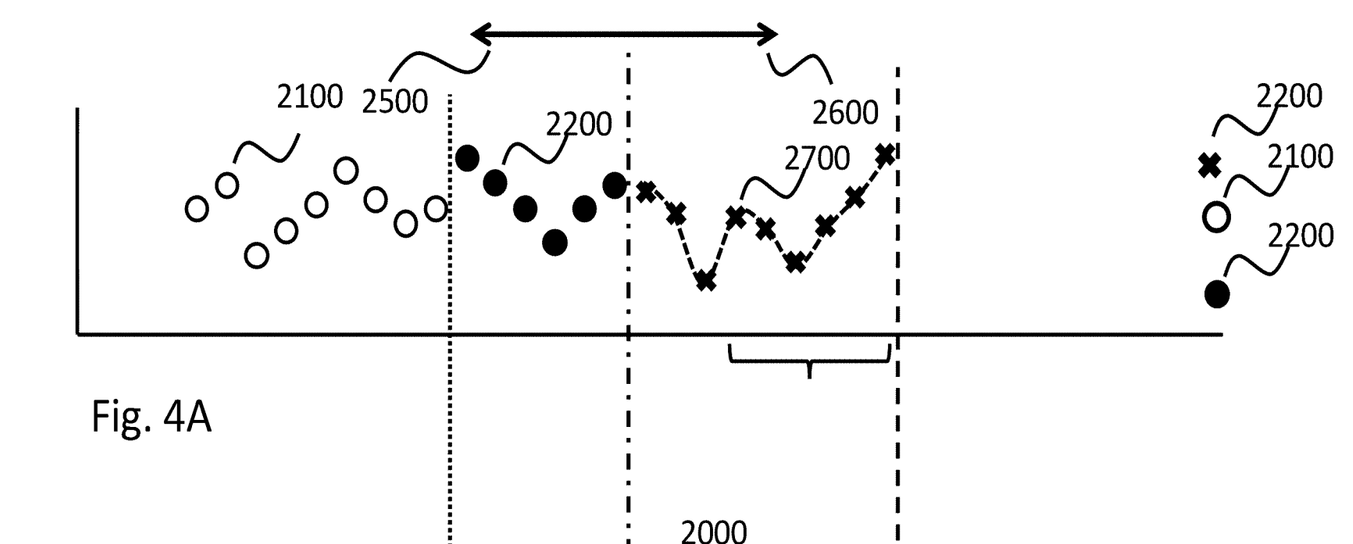
FIGS. 4A and 4B illustrate the principle of the prediction model.
Figure 4B:
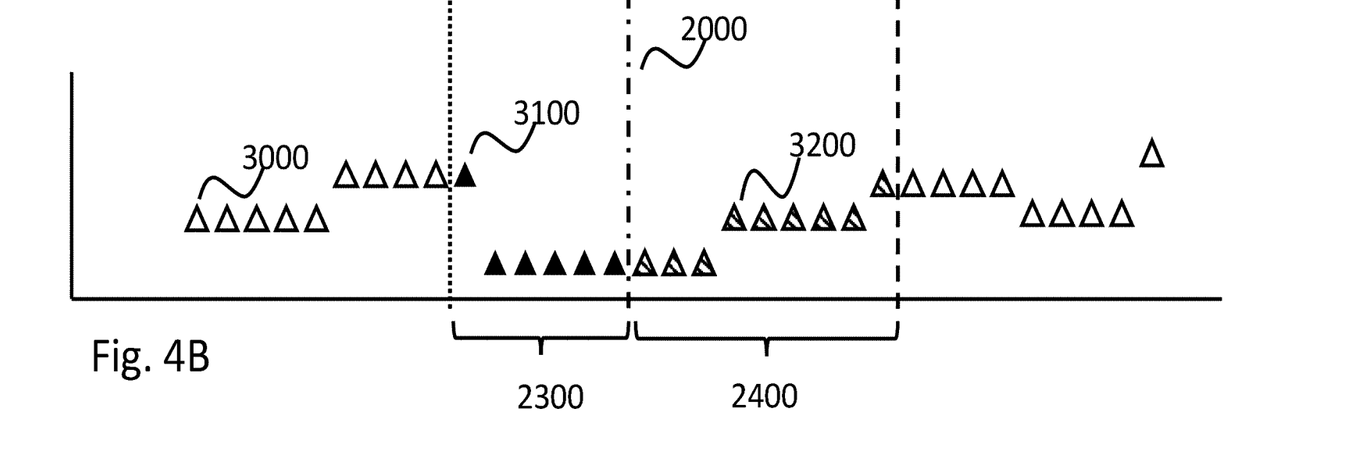

Reference is now made to FIGS. 4A and 4B, which illustrate the principle of the proposed method. The proposed prediction model predicts a key performance indicator based on future operating parameters.

Line 2000 reflects the start of a first iteration of the prediction, which may be the current time. The direction of the past is depicted by an arrow 2500, whilst the direction of the future is depicted as arrow 2600. The values depicted in FIG. 4A are key performance indicators including past values illustrated as hollow circles 2100 and full circles 2200. Full circles also reflect past values that are used in the prediction model. In non-limiting examples, these key performance indicators may be one or more key performance indicators described in the above examples, such as pressure dropover bed (cokes content), heat transfer coefficient, bed-height and conversion for aniline catalyst and outlet temperature for TLE.

The time span for selecting the past values incorporated into the model is depicted as 2300. The prediction horizon is depicted as 2400. Predicted KPI values are shown as 2700. In some examples, there may be only one iteration of prediction. In some instances, it may be favorable to extend the prediction horizon. This may be done by repeatedly perform predictions during or at the end of the first prediction horizon.

FIG. 4B shows the corresponding operating values and process variables. In FIG. 4B, operating values and process variables 3000, 3100, 3200 are plotted along the time axis. Past operating values and process variables, which are not considered in the prediction model, are depicted as 3000. Past operating values and process variables that are considered in the prediction are depicted as 3100 and future operating values and process variables that are considered in the prediction are depicted as 3200 and lie within the prediction horizon 2400. Examples of these operating values and process variables are described above in the section "Examples of prediction models".

In some examples, only future operating parameters may be used for prediction.

In some examples, only future process variables may be used as input for the prediction model. The next prediction cycle starts at 4000, which marks the end of the first prediction horizon 2400 in FIG. 4A.

In some examples, there may be only one iteration of prediction.

Figure 5A:
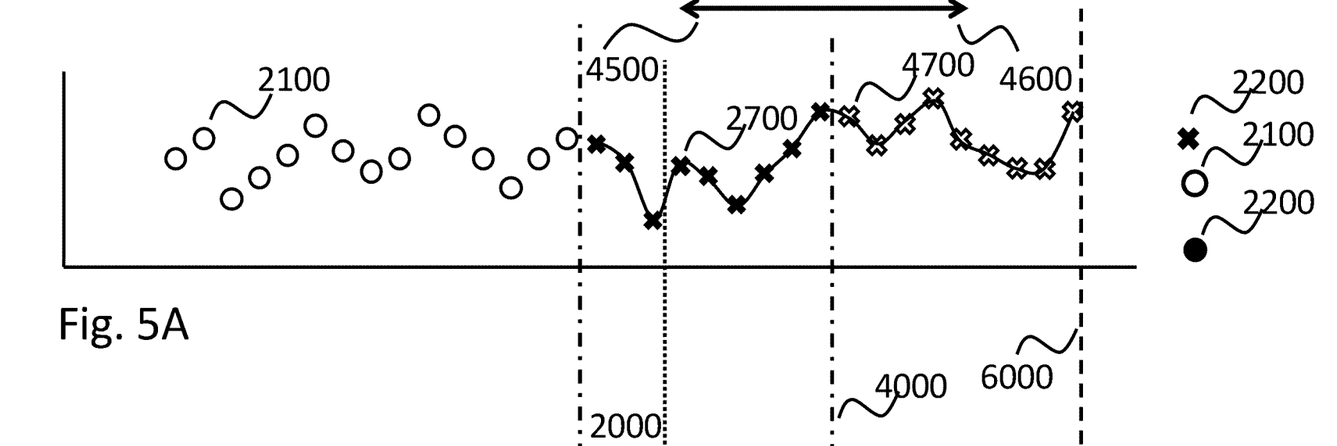
FIGS. 5A and 5B illustrate an example of extending the prediction horizon.
Figure 5B:
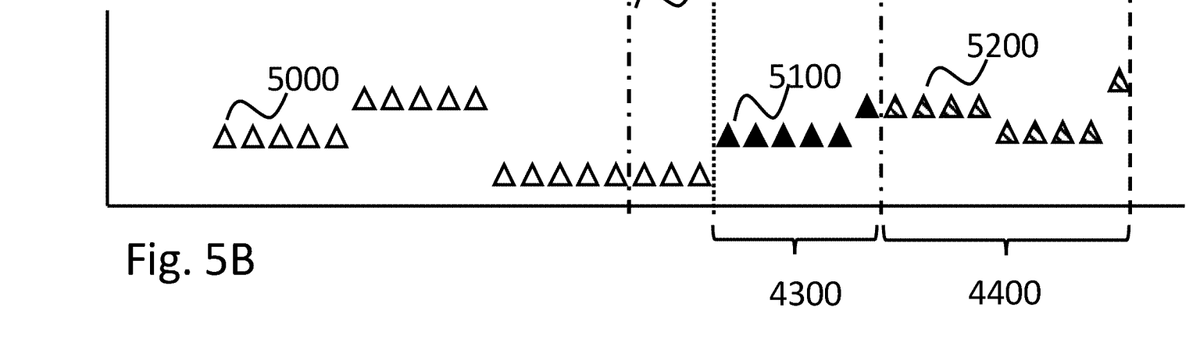

In some examples, it may be favorable to extend the prediction horizon. This may be done by repeatedly performing predictions at the end of the first prediction horizon. An example is shown in FIGS. 5A and 5B. Alternatively (not shown), this may be done by repeatedly performing during the first prediction horizon—that is, the first and second iterations may overlap with each other.

Using an iterative approach with lagged variables may lead in general to better prediction in the nearer future (in the case of aniline 1-2 weeks). This is due to the fact, that the model uses constantly updated initial values. In the farer future (>4 weeks in case of Aniline), simpler models without lagged variables may tend to have better accuracy. The worse performance in the farer future comes from the adding up of the prediction error due to the iterative nature of the model.

Turning to FIG. 5A, a second iteration of the prediction of the key parameter indicators is illustrated. This prediction cycle starts at 4000, which marks the end of the first prediction horizon 2400 in FIG. 4A. Dashed line 4000 marks the same time in FIGS. 4 and 6 alike. The time span for selecting the past values incorporated into the model is here depicted as 4300. The prediction horizon is here depicted as 4400. Predicted KPI values of this iteration are depicted as 4700 empty crosses. The hashed triangles represent the future operation values and process variables for the second iteration. The full prediction now covers the time span from the dot dashed line 2000 to the dashed line 6000. Moreover, the iteration may resemble a moving window approach. Here the window moves to the end of the first prediction time span.

The prediction horizon may be adjustable in dependence on the need of the problem. For example, the prediction horizon may be days or weeks into the future. For example, to schedule the regeneration of the catalyst it is obviously of great advantage to know the evolution of the key performance parameters within at least the next 1-2 weeks and with them the approximate end of campaign/cycle. For example, the end of campaign/cycle is usually reached between 2-5 weeks.

The time window 2300, i.e. the time span for selecting the past values incorporated into the model, may also be adjustable in dependence on the need of the problem. For example, the time window may be 10%, 20%, 30%, 40% or 50% of the time period between two maintenance actions of the equipment.

The prediction model may be a multiple linear regression model. In some examples, the prediction model may be a multiple linear regression model with regularization. Regularization is a process of introducing additional information in order to solve an ill-posed problem or to prevent over-filling. One way to regularize is to add a constraint to the loss function:

Regularized Loss=Loss function+Constraint

There are multiple different forms of constraints that could be used to regularize. Examples include, but are not limited to, Ridge Regression, Lasso, and Elastic Net.

Apparatus for Predicting a Degradation Progress

Figure 6:
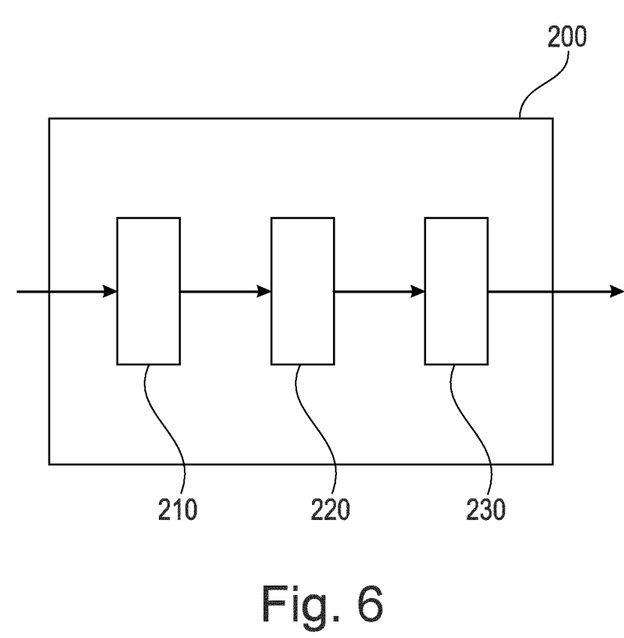
FIG. 6 schematically shows an apparatus for predicting a progress of degradation in an equipment of a chemical production plant.

FIG. 6 schematically shows an apparatus 200 for predicting a progress of degradation in an equipment of a chemical production plant, such as a steam cracker. The apparatus 200 comprises an input unit 210, a processing unit 220, and an output unit 230.

The input unit 210 is configured for receiving a future value of at least one operating parameter of the equipment. The at least one operating parameter has an influence on the degradation of the equipment, and the at least one operating parameter is known and/or controllable over a prediction horizon, such that the future value of the at least one operating parameter can be determined over the prediction horizon.

Optionally, the input unit 210 is further configured for receiving a value of the at least one operating parameter obtained during a current or past operation of the equipment.

Optionally, the input unit 210 is configured for receiving at least one process variable that is measured during a current and/or past operation of the equipment.

Thus, the input unit 210 may be, in an example, implemented as an Ethernet interface, a USB™ interface, a wireless interface such as a WiFi™ or Bluetooth™ or any comparable data transfer interface enabling data transfer between input peripherals and the processing unit 220.

The processing unit 220 is further configured for using a prediction model, such as a multiple linear regression model, to estimate a future value of the at least one key performance indicator within the prediction horizon based on an input data set. The input data set comprises the value of the at least one operating parameter obtained during the current and/or past operation of the equipment and the future value of the at least one operating parameter. The prediction model is parametrized or trained based on a sample set including historical data of the at least one process variable and the at least one operating parameter. The processing unit 220 is further configured for predicting the progress of degradation in the equipment within the prediction horizon based on the future value of the at least one key performance indicator.

Optionally, the input unit 210 is configured for obtaining a value of at least one operating parameter of the equipment during the current and/or past operation of the equipment. The input data set comprises the value of the at least one operating parameter obtained during the current and/or past operation of the equipment.

Optionally, the processing unit 220 is configured for determining a value of the at least one key performance indicator based on the at least one process variable. The input data set further comprises the value of the at least one key performance indicator obtained during the current and/or past operation of the equipment.

Optionally, the processing unit is configured for repeatedly performing the estimation over a further prediction horizon. The further prediction horizon (also referred to as second prediction horizon) is partially overlapped with the prediction horizon (also referred to as first prediction horizon). Alternatively, these two prediction horizon may be separate with each other. This is explained above and in particular with respect to the embodiments shown in FIGS. 5A and 5B.

Thus, the processing unit 220 may execute computer program instructions to perform various processes and methods. The processing unit 220 may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality. Furthermore, such processing unit 220 may be connected to volatile or non-volatile storage, display interfaces, communication interfaces and the like as known to a person skilled in the art.

The output unit 230 configured for outputting the predicted progress of degradation in the equipment.

Thus, the output unit 230 may be in an example, implemented as an Ethernet interface, a USB™ interface, a wireless interface such as a WiFi™ or Bluetooth™ or any comparable data transfer interface enabling data transfer between output peripherals and the processing unit 230.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A computer-implemented method (100) for predicting a progress of degradation in an equipment of a chemical production plant, comprising:
   a) obtaining (110) a future value of at least one operating parameter of the equipment within a prediction horizon that defines a first future time period over which the progress of degradation in the equipment is predicted, wherein the at least one operating parameter has an influence on the degradation of the equipment, and wherein the at least one operating parameter is known and/or controllable over the prediction horizon, such that the future value of the at least one operating parameter can be determined over the prediction horizon;
   b) using (120) a prediction model to estimate a future value of at least one key performance indicator within the prediction horizon based on an input data set comprising the future value of the at least one operating parameter, wherein the prediction model is parametrized or trained based on a sample set including historical data of at least one process variable and the at least one operating parameter, wherein the at least one process variable is used to determine the at least one key performance indicator; and
   c) predicting (130) the progress of degradation in the equipment within the prediction horizon based on the future value of the at least one key performance indicator;
   wherein the progress of degradation comprises one or more of:
      a heat exchanger that suffers from a coking or other fouling process due to at least one of coke layer formation, polymerization, microbial deposits, and inorganic deposits;
      a pipe where mass flow is impeded by a coking or other fouling process due to coke layer formation and/or polymerization;
      a fixed bed reactor that suffers from a coking or other fouling process due to coke layer formation, polymerization, and/or deposits of solid material originating from an upstream unit operation;
      a fluidized bed reactor that suffers from a coking or other fouling process due to coke layer formation, polymerization, and/or deposits of solid material originating from an upstream unit operation;
      a fluidized bed reactor that suffers from a coking or other fouling process due to coke layer formation, polymerization and/or deposits of solid material originating from an upstream unit operation; and
      a filter, the efficiency of which deteriorates due to polymerization and/or deposits of solid material originating from an upstream unit operation.

2. The computer-implemented method according to claim 1, further comprising:
   obtaining a value of at least one operating parameter of the equipment during the current and/or past operation of the equipment;
   wherein the input data set comprises the value of the at least one operating parameter obtained during the current and/or past operation of the equipment.

3. The computer-implemented method according to claim 1, further comprising:
   obtaining at least one process variable that is measured during a current and/or past operation of the equipment;
   determining a value of the at least one key performance indicator based on the at least one process variable obtained during the current and/or past operation of the equipment;
   wherein the input data set further comprises the value of the at least one key performance indicator obtained during the current and/or past operation of the equipment.

4. The computer-implemented method according to claim 1, further comprising:
   repeatedly performing steps a) to c) over a further prediction horizon that defines a second future time period over which the progress of degradation in the equipment is predicted, wherein the first future time period precedes the second future time period in time.

5. The computer-implemented method according to claim 4,
   wherein the further prediction horizon is partially overlapped with the prediction horizon; or
   wherein the further prediction horizon is separate from the prediction horizon.

6. The computer-implemented method according to claim 1,
   wherein the prediction model comprises a multiple linear regression model, optionally with regularization.

7. The computer-implemented method according to claim 1,
   wherein the equipment comprises at least one of:
      a steam-cracker furnace;
      a transfer line exchanger of a steam cracker; and
      an aniline catalyst.

8. An apparatus (200) for predicting a progress of degradation in an equipment of a chemical production plant, comprising:
   a) an input unit (210) configured for receiving a future value of at least one operating parameter of the equipment within a prediction horizon that defines a first future time period over which the progress of degradation in the equipment is predicted,
wherein the at least one operating parameter has an influence on the degradation of the equipment, and
wherein the at least one operating parameter is known and/or controllable over a prediction horizon;
b) a processing unit (220) configured for:
using a prediction model to estimate a future value of at least one key performance indicator within the prediction horizon based on an input data set comprising the future value of the at least one operating parameter,
wherein the prediction model is parametrized or trained based on a sample set including historical data of the at least one process variable and the at least one operating parameter, wherein the at least one process variable is used to determine the at least one key performance indicator; and
predicting the progress of degradation in the equipment within the prediction horizon based on the future value of the at least one key performance indicator; and
c) an output unit (230) configured for outputting the predicted progress of degradation in the equipment
wherein the progress of degradation comprises one or more of:
a heat exchanger that suffers from a coking or other fouling process due to at least one of coke layer formation, polymerization, microbial deposits, and inorganic deposits;
a pipe where mass flow is impeded by a coking or other fouling process due to coke layer formation and/or polymerization;
a fixed bed reactor that suffers from a coking or other fouling process due to coke layer formation, polymerization, and/or deposits of solid material originating from an upstream unit operation;
a fluidized bed reactor that suffers from a coking or other fouling process due to coke layer formation, polymerization, and/or deposits of solid material originating from an upstream unit operation;
a fluidized bed reactor that suffers from a coking or other fouling process due to coke layer formation, polymerization and/or deposits of solid material originating from an upstream unit operation; and
a filter, the efficiency of which deteriorates due to polymerization and/or deposits of solid material originating from an upstream unit operation.

9. The apparatus according to claim 8,
wherein the input unit is configured for obtaining a value of at least one operating parameter of the equipment during the current and/or past operation of the equipment; and
wherein the input data set comprises the value of the at least one operating parameter obtained during the current and/or past operation of the equipment.

10. The apparatus according to claim 8,
wherein the input unit is configured for obtaining at least one process variable that is measured during a current and/or past operation of the equipment;
wherein the processing unit is configured for determining a value of the at least one key performance indicator based on the at least one process variable obtained during the current and/or past operation of the equipment; and
wherein the input data set further comprises the value of the at least one key performance indicator obtained during the current and/or past operation of the equipment.

11. The apparatus according to claim 8,
wherein the processing unit is configured for repeatedly performing the estimation over a further prediction horizon that defines a second future time period over which the progress of degradation in the equipment is predicted, wherein the first future time period precedes the second future time period in time.

12. The apparatus according to claim 11,
wherein the further prediction horizon is partially overlapped with the prediction horizon; or
wherein the further prediction horizon is separate from the prediction horizon.

13. The apparatus according to claim 8,
wherein the prediction model comprises a multiple linear regression model, optionally with regularization.

14. A non-transitory computer readable medium containing computer instructions stored therein for causing a computer processor to perform the steps according to claim 1.

* * * * *